United States Patent
Weill et al.

(10) Patent No.: US 8,588,238 B2
(45) Date of Patent: Nov. 19, 2013

(54) METHOD AND APPARATUS FOR SELF-LEARNING OF VPNS FROM COMBINATIONS OF UNIDIRECTIONAL TUNNELS IN MPLS/VPN NETWORKS

(75) Inventors: Ofer Weill, Modi'in (IL); Assi Abramovitz, Tel-Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 13/534,608

(22) Filed: Jun. 27, 2012

(65) Prior Publication Data

US 2012/0263183 A1    Oct. 18, 2012

Related U.S. Application Data

(63) Continuation of application No. 11/287,824, filed on Nov. 28, 2005, now Pat. No. 8,270,413.

(51) Int. Cl.
*H04L 12/28* (2006.01)
*H04L 12/56* (2006.01)

(52) U.S. Cl.
USPC ............... 370/395.53; 370/389; 370/392

(58) Field of Classification Search
None
See application file for complete search history.

(56) References Cited

U.S. PATENT DOCUMENTS

| | | |
|---|---|---|
| 5,606,668 A | 2/1997 | Shwed |
| 6,205,488 B1 | 3/2001 | Casey et al. |
| 6,339,595 B1 | 1/2002 | Rekhter et al. |
| 6,463,061 B1 | 10/2002 | Rekhter et al. |
| 6,542,508 B1 | 4/2003 | Lin |
| 6,611,872 B1 | 8/2003 | McCanne |
| 6,693,878 B1 | 2/2004 | Daruwalla et al. |
| 6,831,893 B1 | 12/2004 | Ben Nun et al. |
| 6,928,482 B1 | 8/2005 | Ben Nun et al. |
| 7,280,540 B2 | 10/2007 | Halme et al. |
| 7,411,975 B1 * | 8/2008 | Mohaban ............ 370/466 |
| 2001/0019554 A1 | 9/2001 | Nomura et al. |
| 2003/0021269 A1 | 1/2003 | Calvignac et al. |
| 2003/0053448 A1 | 3/2003 | Craig et al. |
| 2003/0133412 A1 | 7/2003 | Iyer et al. |

(Continued)

FOREIGN PATENT DOCUMENTS

| | | | |
|---|---|---|---|
| WO | WO-02/41572 A2 | 5/2002 | |
| WO | WO-02/41572 A3 | 5/2002 | |

OTHER PUBLICATIONS

Cisco White Paper "Managing Peer-To-Peer Traffic with Cisco Service Control Technology" Cisco Systems, Inc., 2005.

(Continued)

*Primary Examiner* — Jae Y Lee
(74) *Attorney, Agent, or Firm* — Novak Druce Connolly Bove + Quigg LLP

(57) ABSTRACT

In one embodiment, a data packet is received at a network device. A layer-2 identification (L2ID) value is identified for the received data packet based on a destination address and a label stack of the received data packet. The L2ID value is specific to an application associated with the data packet. A 6-tuple is created that includes the L2ID value. The received data packet is classified using the 6-tuple. Deep packet inspection (DPI) services are performed based on the classification of the received data packet. The DPI services apply a set of one or more application-level policies to the received data packet. The received data packet is forwarded from the network device toward a destination.

18 Claims, 10 Drawing Sheets

(56) References Cited

U.S. PATENT DOCUMENTS

| | | | |
|---|---|---|---|
| 2003/0188001 A1* | 10/2003 | Eisenberg et al. | 709/229 |
| 2004/0093513 A1 | 5/2004 | Cantrell et al. | |
| 2004/0156313 A1* | 8/2004 | Hofmeister et al. | 370/229 |
| 2004/0196827 A1 | 10/2004 | Xu et al. | |
| 2004/0230444 A1 | 11/2004 | Holt et al. | |
| 2005/0063302 A1 | 3/2005 | Samuels et al. | |
| 2005/0190694 A1 | 9/2005 | Ben-Nun et al. | |
| 2005/0262472 A1 | 11/2005 | Wood et al. | |
| 2006/0050736 A1* | 3/2006 | Segel | 370/474 |
| 2007/0011329 A1 | 1/2007 | Albert et al. | |
| 2008/0025218 A1* | 1/2008 | Liu | 370/235 |

OTHER PUBLICATIONS

Cisco Data Sheet, "Cisco SCE 1000 Series Service Control Engine" Cisco Systems, Inc., 2004.

Cisco SCE 1000 Series Service Control Engine "Optimizing Application Traffic With Cisco Service Control Technology" Cisco Systems, Inc., 2005, <http://www.cisco.com/en/US/products/ps6150/prod_brochure0900aecd80241955.html>.

Cisco Solution Overview "Optimizing Application Traffic with Cisco Service Control Technology" Cisco Systems, Inc., 2005.

Porter, Dr. Thomas, "The Perils of Deep Packet Inspection" Jan. 11, 2005, <http://www.securityfocus.com/infocus/1817>.

Request for Comments 793, "Transmission Control Protocol" prepared for DARPA by the Information Sciences Institute, Sep. 1981, <http://www.faqs.org/rfcs/rfc793.html>.

Tanenbaum, Andrew S., "Computer Networks" Fourth Edition, Pearson Education, Inc., 2003 pp. 41-44.

Thomas, Stephen A., "IP Switching and Routing Essentials", John Wiley & Sons, Inc., 2002 pp. 221-243.

Ivan Pepelnjak et al., "MPLS and VPN Architectures" Cisco Press, 2001, pp. 145-205.

E. Rosen et al., Request for Comments 2547, "BGP/MPLS VPNs," Mar. 1999.

PCT Notification of Transmittal of the International Search Report and the Written Opinion of the International Searching Authority, or the Declaration, International Application No. PCT/US06/45415, International Filing Date Nov. 27, 2006, Date of Mailing Oct. 10, 2007, 10 pages.

Supplementary European Search Report, European Application No. 06838403.1-2416 / 1955499, PCT/US200645415, Applicant: Cisco Technology, Inc., Date of Mailing: Feb. 17, 2011, pp. 1-7.

* cited by examiner

L2ID TABLE 400a

| PE-MAC ADDRESS 420 | DOWNSTREAM VPN LABEL 430 | L2ID VALUE 440 |
|---|---|---|
| PE1-MAC | 5 | 1 |
| PE2-MAC | 13 | 2 |
| PE3-MAC | 5 | 3 |
| ⋮ | ⋮ | ⋮ |

L2ID TABLE 400b

| P-MAC ADDRESS 460 | UPSTREAM MPLS LABEL STACK 470 | L2ID VALUE 480 |
|---|---|---|
| P1-MAC | 17, 9 | 2 |
| ⋮ | ⋮ | ⋮ |

FLOW-CLASSIFICATION TABLE 500

| 5-TUPLE 520 | L2ID 530 | FLOW ID (PROCESSOR-FLOW ID) 540 |
|---|---|---|
| 510a → (PROTOCOL, SOURCE_IP, DEST_IP, SOURCE_PORT, DEST_PORT) | * | PP1-6 |
| ... | ... | ... |

FIG. 5A

FLOW-CLASSIFICATION TABLE 500

| 5-TUPLE 520 | L2ID 530 | FLOW ID (PROCESSOR-FLOW ID) 540 |
|---|---|---|
| 510b → (PROTOCOL, SOURCE_IP, DEST_IP, SOURCE_PORT, DEST_PORT) | 2 | PP1-6 |
| ... | ... | ... |

FIG. 5B

| FLOW ID 620 | TCP SEQ. NO. 630 | P-MAC ADDRESS 640 | UPSTREAM MPLS LABEL STACK 650 | STATE INFORMATION 660 |
|---|---|---|---|---|
| 6 | X | P1-MAC | 17, 9 | |
| ... | ... | ... | ... | ... |

PROCESSOR-STATE TABLE 600

FIG. 6

| P-MAC ADDRESS 910 | UPSTREAM MPLS LABEL STACK 920 | TIME STAMP FOR LAST RECEIVED PACKET 930 |
|---|---|---|
| P1-MAC | 17, 9 | TIMESTAMP |
| ⋮ | ⋮ | ⋮ |

LABEL-AGING TABLE 900

METHOD AND APPARATUS FOR SELF-LEARNING OF VPNS FROM COMBINATIONS OF UNIDIRECTIONAL TUNNELS IN MPLS/VPN NETWORKS

RELATED APPLICATIONS

This application is a continuation of U.S. patent application Ser. No. 11/287,824, titled "Method and Apparatus for Self-Learning of VPNS From Combinations of Unidirecional Tunnels in MPLS/VPN Networks", filed by Ofer Weill et al., on Nov. 28, 2005, the content of which are incorporated by reference herein in their entirety.

FIELD OF THE INVENTION

This invention relates generally to computer networks, and, more specifically, to a novel technique for implementing deep-packet inspection (DPI) services in a MPLS-VPN configured computer network.

BACKGROUND OF THE INVENTION

A computer network is a geographically distributed collection of interconnected subnetworks, such as local area networks (LAN) that transport data between network nodes. As used herein, a network node is any device adapted to send and/or receive data in the computer network. Thus, in this context, "node" and "device" may be used interchangeably. Data exchanged between network nodes is generally referred to herein as data traffic. The network topology is defined by an arrangement of network nodes that communicate with one another, typically through one or more intermediate nodes, such as routers and switches. In addition to intra-network communications, data also may be exchanged between neighboring (i.e., adjacent) networks. To that end, "edge devices" located at the logical outer-bound of the computer network may be adapted to send and receive inter-network communications. Both inter-network and intra-network communications are typically effected by exchanging discrete packets of data according to predefined protocols. In this context, a protocol consists of a set of rules defining how network nodes interact with each other.

A data packet is generally any packet, frame or cell, that is configured to transport data in a computer network. Each data packet typically comprises "payload" data prepended ("encapsulated") by at least one network header formatted in accordance with a network communication protocol. The network headers include information that enables network nodes to efficiently route the packet through the computer network. Often, a packet's network headers include a data-link (layer 2) header, an internetwork (layer 3) header and a transport (layer 4) header as defined by the Transmission Control Protocol/Internet Protocol (TCP/IP) Reference Model. The TCP/IP Reference Model is generally described in more detail in Section 1.4.2 of the reference book entitled *Computer Networks, Fourth Edition*, by Andrew Tanenbaum, published 2003, which is hereby incorporated by reference as though fully set forth herein.

The data-link header provides information for transmitting the packet over a particular physical link (i.e., a communication medium), such as a point-to-point link, Ethernet link, wireless link, optical link, etc. To that end, the data-link header may specify a pair of "source" and "destination" network interfaces that are connected by the physical link. Each network interface contains the mechanical, electrical and signaling circuitry and logic used to couple a network node to one or more physical links. A network interface is often associated with a hardware-specific address, known as a media access control (MAC) address. Accordingly, the source and destination network interfaces in the data-link header are typically represented as source and destination MAC addresses. The data-link header may also store flow control, frame synchronization and error checking information used to manage data transmissions over the physical link.

The internetwork header provides information defining the packet's logical path through the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the client node assigned to the destination IP address stored in the packet's internetwork header. After each hop, the source and destination MAC addresses in the packet's data-link header may be updated, as necessary. However, the source and destination IP addresses typically remain unchanged as the packet is transferred from link to link in the network.

The transport header provides information for ensuring that the packet is reliably transmitted from the source node to the destination node. The transport header typically includes, among other things, source and destination port numbers that respectively identify particular software applications executing in the source and destination nodes. More specifically, the packet is generated in the source node by the application assigned to the source port number. Then, the packet is forwarded to the destination node and directed to the application assigned to the destination port number. The transport header also may include error-checking information (i.e., a checksum) and other data-flow control information. For instance, in connection-oriented transport protocols such as the Transmission Control Protocol (TCP), the transport header may store sequencing information that indicates the packet's relative position in a transmitted stream of data packets. The TCP protocol is generally described in more detail in the Request for Comments (RFC) 793, entitled *Transmission Control Protocol*, published September 1981, which publication is publicly available through the Internet Engineering Task Force (IETF) and is expressly incorporated herein by reference as though fully set forth herein.

Multi-Protocol Label Switching/Virtual Private Network Architecture

A virtual private network (VPN) is a collection of network nodes that establish private communications over a shared backbone network. Previously, VPNs were implemented by embedding private leased lines in the shared network. The leased lines (i.e., communication links) were reserved only for network traffic among those network nodes participating in the VPN. Today, the above-described VPN implementation has been mostly replaced by private "virtual circuits" deployed in public networks. Specifically, each virtual circuit defines a logical end-to-end data path between a pair of network nodes participating in the VPN.

A virtual circuit may be established using, for example, conventional layer-2 Frame Relay (FR) or Asynchronous Transfer Mode (ATM) networks. Alternatively, the virtual circuit may "tunnel" data between its logical end points using known layer-2 and/or layer-3 tunneling protocols, such as the Layer-2 Tunneling Protocol (L2TP) or the Generic Routing Encapsulation (GRE) protocol. In this case, one or more tunnel headers are prepended to a data packet to appropriately route the packet along the virtual circuit. The Multi-Protocol Label Switching (MPLS) protocol may be used as a tunneling mechanism for establishing layer-2 virtual circuits or layer-3 network-based VPNs through an IP network.

MPLS enables network nodes to forward packets along predetermined "label switched paths" (LSP). Each LSP defines a logical data path, or virtual circuit, over which a source node can transmit data to a destination node. As used herein, a unidirectional tunnel is a logical data path configured to transmit data traffic in a single direction between network nodes. Thus, a LSP is an example of a unidirectional tunnel in a MPLS-configured network. A data flow is more generally an exchange of data traffic between network nodes, the data traffic having a common set of characteristics, such as the same source and destination IP addresses, source and destination TCP port numbers, and so forth. A data flow may be unidirectional or bidirectional. For instance, a bidirectional data flow may "tunnel" through a MPLS-configured network in the form of opposing unidirectional tunnels established in the network, whereas a unidirectional data flow may require only a single unidirectional tunnel to traverse the network.

It is often necessary for a pair of source and destination nodes to establish more than one LSP between them, i.e., to support multiple unidirectional tunnels. For instance, the source and destination nodes may be configured to transport data for an application that requires opposing unidirectional tunnels—i.e., a first unidirectional tunnel from the source node to the destination node and a second unidirectional tunnel from the destination node to the source node. An example of such an application requiring two-way communications may be a voice telephone call, in which opposing unidirectional tunnels must be established in order to transport voice-over-IP (VoIP) data between the source and destination nodes.

Unlike traditional IP routing, where node-to-node ("next hop") forwarding decisions are performed based on destination IP addresses, MPLS-configured nodes instead forward data packets based on "label" values (or "tag" values) added to the IP packets. As such, a MPLS-configured node can perform a label-lookup operation to determine a packet's next-hop destination along a LSP. For example, the destination node at the end of the LSP may allocate a VPN label value to identify a data flow's next-hop destination in an adjacent ("neighboring") routing domain. The destination node may advertise the VPN label value, e.g., in a conventional Multi-Protocol Border Gateway Protocol (MP-BGP) message, to the source node located at the start of the LSP. Thereafter, the source node incorporates the advertised VPN label value into each data packet that it transmits over the LSP to the destination node. The destination node performs VPN-label lookup operations to render inter-domain forwarding determinations for the data packets that it receives.

While the VPN label value may be used by the destination node to identify a next-hop destination at the end of the LSP, next-hop destinations along the LSP may be determined based on locally-allocated interior-gateway protocol (IGP) label values. Specifically, each logical hop along the LSP may be associated with a corresponding IGP label value. For purposes of discussion, assume that the source node communicates data to the destination node in a "downstream" direction, such that every logical hop along the LSP consists of an upstream node that forwards data packets to a neighboring downstream node. Typically, the downstream node allocates an IGP label value and sends the IGP label value to the neighboring upstream node using, e.g., the Label Distribution Protocol or Resource Reservation Protocol. Then, the upstream node incorporates the IGP label value into data packets that it forwards to the downstream node along the LSP. Penultimate hop popping (PHP) is often employed for the LSP's last logical hop, such that an IGP label is not included in data packets sent to the destination node. In this way, the PHP-enabled destination node does not perform IGP label-lookup operations and uses only VPN labels to determine the data packets' next-hop destinations, thereby reducing the number of label-lookup operations that it performs.

A data packet may contain a "stack" of MPLS labels, such as the above-noted IGP and VPN labels. The label stack's top-most label typically determines the packet's next-hop destination. After receiving a data packet, a MPLS-configured node "pops" (removes) the packet's top-most label from the label stack and performs a label-lookup operation to determine the packet's next-hop destination. Then, the node "pushes" (inserts) a new label value associated with the packet's next hop onto the top of the stack and forwards the packet to its next destination. This process is repeated for every logical hop along the LSP until the packet reaches its destination node. The above-described MPLS operation is described in more detail in Chapter 7 of the reference book entitled *IP Switching and Routing Essentials*, by Stephen Thomas, published 2002, which is hereby incorporated by reference as though fully set forth herein.

Layer-3 network-based VPN services that utilize MPLS technology are often deployed by network service providers for one or more customer sites. These networks are typically said to provide "MPLS/VPN" services. As used herein, a customer site is broadly defined as a routing domain containing at least one customer edge (CE) device coupled to a provider edge (PE) device in the service provider's network ("provider network"). The PE and CE devices are generally intermediate network nodes, such as routers or switches, located at the edge of their respective networks. The PE-CE data links may be established over various physical mediums, such as conventional wire links, optical links, wireless links, etc., and may communicate data formatted using various network communication protocols including ATM, Frame Relay, Ethernet, Fibre Distributed Data Interface (FDDI), etc. In addition, the PE and CE devices may be configured to exchange routing information over their respective PE-CE links in accordance with various interior and exterior gateway protocols. Non-edge devices located within the interior of the MPLS/VPN network are generally referred to as provider (P) devices.

In the traditional MPLS/VPN network architecture, each customer site may participate in one or more different VPNs. Most often, each customer site is associated with a single VPN, and hereinafter the illustrative embodiments will assume a one-to-one correspondence between customer sites and VPNs. For example, customer sites owned or managed by a common administrative entity, such as a corporate enterprise, may be statically assigned to the enterprise's VPN. As such, network nodes situated in the enterprise's various customer sites participate in the same VPN and are therefore permitted to securely communicate with one another via the provider network. This widely-deployed MPLS/VPN architecture is generally described in more detail in Chapters 8-9 of the reference book entitled *MPLS and VPN Architecture, Volume* 1, by I. Pepelnjak et al., published 2001 and in the IETF publication RFC 2547, entitled *BGP/MPLS VPNs*, by E. Rosen et al., published March 1999, each of which is hereby incorporated by reference as though fully set forth herein.

Deep Packet Inspection Services

As used herein, an application is any type of network software that may be used to effectuate communications in a computer network. For instance, an application may be a network protocol or other network application that executes on a first network node and is configured to communicate with a similar application executing on a second network node. Examples of applications include, among other things, conventional web-browsing software, multimedia and streaming software, peer-to-peer (P2P) software, authentication-authorization-accounting (AAA) software, VoIP software, network-messaging software, file-transfer software, and so on. Those skilled in the art will appreciate that there exists an almost unlimited number of types of applications within the scope of the present disclosure, far too many to list explicitly. Hereinafter, a subscriber is a user of an application. Thus, a subscriber may be an individual or other entity which uses an application to communicate in the computer network.

It is often desirable to monitor network traffic and impose various application-level policies for optimizing and managing resource usage in a computer network. Accordingly, a network administrator may apply application-level policies that implement predefined rules for controlling network traffic patterns, e.g., based on application and/or subscriber-related information. For instance, a network administrator may select a set of rules for managing the allocation of available bandwidth among various applications or subscribers. Yet other rules may be used to filter certain types of traffic that are known to be unsafe or unauthorized. The administrator also may select rules for controlling quality of service, subscriber billing, subscriber usage, and so forth. In general, the network administrator may implement almost any type of rule-based policy to ensure that the network traffic conforms with a desired pattern of behavior.

Deep packet inspection (DPI) services provide a useful means for implementing application-level policies in a computer network. The DPI services may be configured to analyze the contents of one or more application-level packet headers and, in some cases, selected portions of the packet's payload data as well. By analyzing the packet's application-level headers and/or payload data, the DPI services can implement a selected set of application-level policies consistent with the packet's contents. The DPI services may be configured to apply different application-level policies for different types of data flows. Thus, a data packet first may be classified as belonging to a particular data flow, then the DPI services can select an appropriate set of application-level policies to apply to the packet based on the packet's flow classification. The application-level policies may indicate, for example, whether the data packet should be dropped, modified, forwarded, etc. Alternatively, the policies may collect information, such as packet-related statistics, that enable a system administrator to configure (or reconfigure) aspects of the computer network. Those skilled in the art will appreciate that the DPI services may employ various different types of application-level policies without limitation.

In practice, when a data packet is received at a network node, the node may perform a stateful flow-classification procedure that associates the received data packet with a particular data flow. The procedure is "stateful" in the sense that the network node may store state information associated with one or more known data flows, and then may "match" the received data packet with a known data flow by comparing the packet's contents with the stored state information. The conventional flow-classification procedure is usually performed based on the contents of selected fields in the packet's layer-3 and layer-4 (IP and transport layer) headers. After the packet's data flow has been identified, the network node may determine which set of application-level policies to implement based on the packet's flow classification. Thereafter, the DPI services in the network node apply the appropriate application-level policies to the received data packet.

Most typically, a conventional 5-tuple is used to classify an IP packet's data flow. By way of example, consider the data packet 100 illustrated in FIG. 1. The packet includes a data-link header 110, IP header 120, transport header 130, application header(s) 140, payload data 150 and a cyclic redundancy check (CRC) 160. The data-link, IP and transport headers are conventional packet headers known in the art. The headers 110-130 may encapsulate one or more application headers 140, which store application-specific information related to the payload data 150. For instance, the application headers 140 may contain information that is useful for a particular application to process the payload data 150. The CRC 160 is a data-integrity check value that may be used to verify that the contents of the data packet 100 were not altered in transit.

The conventional 5-tuple 170 may be extracted from the data packet 100, as shown. Specifically, the 5-tuple includes a protocol field 122, source-IP-address field 124, destination-IP-address field 126, source-port field 132 and destination-port field 134. The protocol field 122 contains an identifier corresponding to the data format and/or the transmission format of the payload data 150. The source-IP-address field 124 contains a source IP address that identifies the source node transmitting the data packet. Similarly, the destination-IP-address field 126 contains a destination address identifying the packet's intended destination node. The source-port and destination-port fields 132 and 134 store values, such as standard TCP port numbers, that respectively identify software applications executing in the source and destination nodes. While the fields 122-126 are extracted from the IP header 120, the fields 132-134 are typically extracted from the transport header 130.

In most IP-based networks, the conventional 5-tuple 170 may be used to uniquely associate the data packet 100 with its particular application. This is generally because each IP data flow generated by the application contains the same protocol identifier 122, source and destination IP addresses 124 and 126 and source and destination port numbers 132 and 134. For instance, suppose that the application establishes opposing unidirectional IP data flows between a pair of network nodes N1 and N2. Further, assume that the node N1 executes the application using the protocol identifier "A", an IP address "B" and port number "C," and the node N2 executes the same application using the protocol identifier "A," an IP address "D" and a port number "E." In this case, a unidirectional IP data flow established by the application from N1 to N2 is associated with the 5-tuple {A, B, C, D, E}. Likewise, a second IP data flow established by the application from N2 to N1 is also associated with the same set of 5-tuple values {A, B, C, D, E}. Notably, the order of individual values in the 5-tuple does not have to be identical for the two IP data flows to "match" the application.

Because data packets containing the same 5-tuple 170 usually can be reliably associated with the same application, conventional 5-tuple flow-classification procedures can be used by DPI services for selecting which application-level policies to apply to received data packets. That is, a data packet first may be classified as belonging to a particular data flow based on the packet's contained 5-tuple. Then, the DPI services can select an appropriate set of application-level policies to apply to the packet based on the packet's 5-tuple flow classification.

Despite the above-noted advantages, the conventional 5-tuple flow-classification technique is generally ineffective in MPLS/VPN networks. Problems arise because multiple data flows may utilize the same set of 5-tuple values through the MPLS/VPN network even though the data flows transport data for different applications. More specifically, the conventional 5-tuple is not necessarily unique among applications in the MPLS/VPN network because it is possible for different VPNs to allocate overlapping IP address ranges, which in turn may result in the same source and destination IP addresses being allocated for use by different applications, i.e., executing in different VPNs. As a result, the conventional 5-tuple flow-classification procedure may inadvertently misclassify some data packets in different VPNs as belonging to the same data flow. This misclassification, in turn, may result in the DPI services applying the wrong set of application-level policies to the misclassified data packets. For this reason, DPI services typically cannot be reliably deployed in MPLS/VPN networks.

Without the benefit of conventional 5-tuple flow-classification, it is very difficult for DPI services to determine the application-level relationships of data flows that establish unidirectional tunnels, or LSPs, in the MPLS/VPN network. First of all, each unidirectional tunnel is typically associated with a different set of MPLS label values, which are locally-allocated by network nodes situated along the tunnel's LSP. Thus, multiple unidirectional tunnels may transport data for the same application, although each of the tunnels utilizes a different set of IGP and VPN label values. Current MPLS/VPN deployments do not include mechanisms for associating (or "binding") the different sets of locally-allocated MPLS label values with the same VPN or application. Because MPLS label values cannot be easily associated with applications, DPI services presently cannot analyze MPLS label values transported in a unidirectional tunnel in order to determine which application-level policies to apply to the data traffic transported through that tunnel. In short, DPI services currently cannot determine the application-level relationships among unidirectional tunnels in a MPLS/VPN network.

Because of the foregoing difficulties, DPI services are not presently employed in MPLS/VPN networks or in other similar networks in which conventional 5-tuple flow-classification cannot reliably identify application-level relationships among a plurality of unidirectional tunnels. It is therefore generally desirable to provide a technique for deploying DPI services in a MPLS/VPN-configured computer network. The technique should enable the DPI services to apply a set of application-level policies to multiple units directional tunnels associated with the same application.

SUMMARY OF THE INVENTION

The present invention overcomes the disadvantages of the prior art by providing a technique for implementing deep-packet inspection (DPI) services in a MPLS/VPN configured computer network. The technique employs a novel self-learning algorithm that analyzes data packets belonging to different unidirectional tunnels in the MPLS/VPN network and determines whether the analyzed data packets transport data in the same VPN. If so, the unidirectional tunnels containing the analyzed data packets are associated with a common layer-2 identification (L2ID) value. Unlike conventional flow-classification procedures, the inventive technique classifies data packets by first associating the data packets with corresponding L2ID values and then classifying the data packets as belonging to particular data flows based on their associated L2ID values in combination with other flow-classification information. For instance, in an illustrative embodiment, a stateful flow-classification procedure classifies data packets using a novel 6-tuple consisting of a conventional 5-tuple plus the L2ID value. Because unidirectional tunnels corresponding to the same application data flow transport data packets having the same set of 6-tuple values, DPI services can apply application-level policies to the classified data packets consistent with their 6-tuple flow classifications.

Further to the illustrative embodiment, a network device is deployed in the MPLS/VPN network to provide DPI services in accordance with the inventive technique. Operationally, when the network device detects a data packet corresponding to a new "upstream" data flow, e.g., sent from a first PE device to a second PE device, the network device attempts to match the detected upstream data packet with a corresponding "downstream" data packet sent in the same VPN but in an opposite direction, e.g., from the second PE device to the first PE device. The network device determines that the upstream and downstream data packets match, and thus belong to opposing unidirectional tunnels in the same VPN, if the upstream and downstream data packets correspond to opposing unidirectional tunnels established for use by the same application. To make this determination, the network device may examine protocol-specific information stored in the upstream and downstream data packets. For example, in a preferred embodiment, the network device may be configured to match an upstream TCP SYN data packet with a corresponding downstream TCP SYN/ACK data packet, e.g., based on the values of their respectively stored TCP sequence numbers. In such a case, the network device can conclude that the matching TCP SYN and SYN/ACK data packets correspond to opposing unidirectional tunnels that are being established for use by the same application.

After successfully matching a pair of upstream and downstream data packets, the network device preferably associates the MPLS label values and destination MAC addresses stored in the matching data packets with a common L2ID value. For instance, in an illustrative network configuration, the L2ID value may be associated with the VPN label value and destination PE-device MAC address stored in the downstream data packet, and also may be associated with the MPLS label stack and destination P-device MAC address stored in the upstream data packet. Subsequently, the network device classifies upstream and downstream data packets by first mapping their contained MPLS label values and destination MAC addresses to equivalent L2ID values, then using the L2ID values to create a novel 6-tuple which may be used to classify the packets as belonging to particular data flows. The network device implements its DPI services for the classified data packets based on their respective 6-tuple flow classifications. The DPI services may include, among other things, application-level policies for managing applications and/or subscribers in the MPLS/VPN network. Preferably, the network device employs an aging mechanism for determining which L2ID values may be deallocated because their associated data flows are no longer "active," i.e., sending and receiving data over unidirectional tunnels in the MPLS/VPN network.

Advantageously, the network device may be embodied as a service control engine (SCE) that is configured to monitor unidirectional tunnels for a predetermined set of PE devices in the MPLS/VPN computer network. The SCE may be transparently inserted into the network, and thus may be configured to perform its management functions and DPI services for the predetermined set of PE devices without being directly addressable by the PE devices. The network device is preferably configured to perform the novel stateful flow-classification procedure at line speeds. More generally, the present invention may be implemented in hardware, software, firmware or various combinations thereof without departing from the spirit and scope of the invention. Further, the invention may be deployed in various network topologies in which conventional 5-tuple flow classification prevents DPI services from applying a consistent set of application-level policies to unidirectional tunnels associated with the same application.

BRIEF DESCRIPTION OF THE DRAWINGS

The above and further advantages of the invention may be better understood by referring to the following description in conjunction with the accompanying drawings in which like reference numerals indicate identically or functionally similar elements, of which:

FIGS. 4A-B are schematic block diagrams of exemplary L2ID tables which may be implemented in the exemplary SCE in accordance with the illustrative embodiment;

FIG. 5A is a schematic block diagram of an exemplary flow-classification table that may be used to perform the novel 6-tuple flow-classification procedure in accordance with the illustrative embodiment. The flow-classification table includes a "*" entry that may be used to implement the novel self-learning algorithm in accordance with the illustrative embodiment;

FIG. 5B is a schematic block diagram of the exemplary flow-classification table in which the "*" entry has been replaced in accordance with the illustrative embodiment;

FIG. 6 is a schematic block diagram of an exemplary processor-state table that may be used in accordance with the illustrative embodiment;

FIG. 9 is a schematic block diagram of an exemplary label-aging table that may be used to age upstream MPLS labels in accordance with the illustrative embodiment.

DETAILED DESCRIPTION OF AN ILLUSTRATIVE EMBODIMENT

Figure 1:
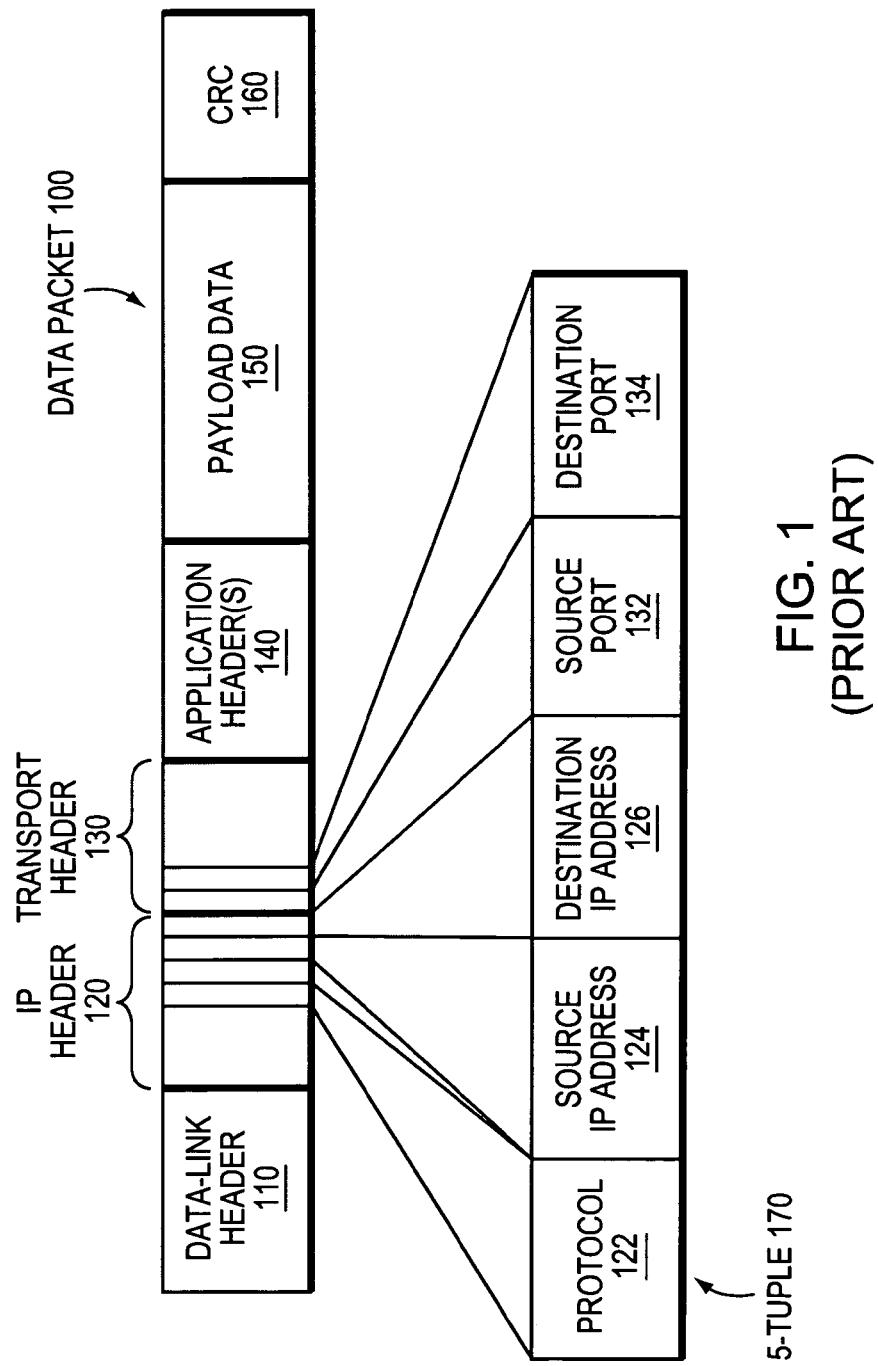
FIG. 1, previously described, is a schematic block diagram of an exemplary data packet that may be transported in a MPLS/VPN provider network.
Figure 2:
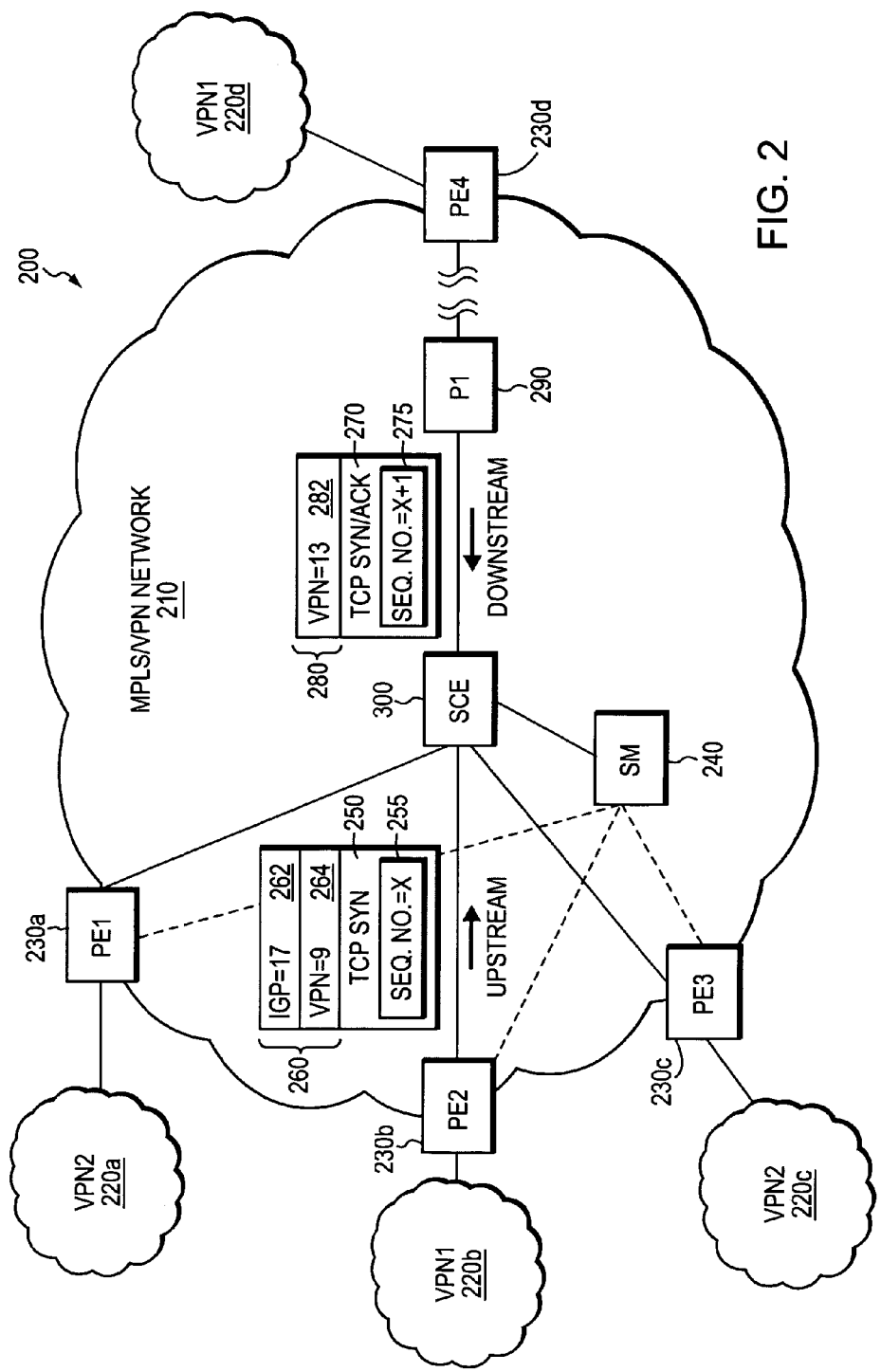
FIG. 2 is a schematic block diagram of an exemplary computer network in which an illustrative embodiment of the invention may be deployed.

FIG. 2 illustrates an exemplary computer network 200 in which an illustrative embodiment of the invention may be deployed. The network 200 includes an exemplary MPLS/VPN-configured provider network 210 ("provider network") that is coupled to a plurality of neighboring customer sites 220. For example, as shown, the provider network 210 includes provider-edge devices PE1 230a, PE2 230b, PE3 230c and PE4 230d, which are respectively coupled to the neighboring customer sites 220a, 220b, 220c and 220d.

Each of the customer sites 220 may be configured to participate in one or more VPNs, whereby customer sites participating in the same VPN can exchange data with one another via the provider network 210. By way of example, the exemplary computer network 200 includes the customer sites 220b and 220d that participate in a first VPN (VPN1), and the customer sites 220a and 220c that participate in a second VPN (VPN2), which is different than the first VPN. The provider network 210 may establish a first set of LSPs for transporting VPN1 data between the customer sites 220b and 220d, and further may establish a second set of LSPs for transporting VPN2 data between the customer sites 220a and 220c. In this context, each LSP is a unidirectional tunnel used to transport data traffic from a source PE device to a destination PE device, where both the source and destination PE devices are coupled to customer sites participating in the same VPN.

Although the provider network 210 supports individual unidirectional tunnels between pairs of customer sites, the customer sites often execute applications which create data flows requiring multiple unidirectional tunnels for tunneling the application's data traffic through the provider network. For example, the customer sites 220b and 220d in VPN1 may execute an application, such as VoIP software, requiring two-way communications at the application-level. In the case of VoIP software, the provider network 210 may establish opposing unidirectional tunnels for transporting both sides of a voice conversation between subscribers located in the customer sites 220b and 220d. Likewise, other types of applications executing in VPN1 or VPN2 also may require the provider network to establish multiple unidirectional tunnels.

In current MPLS/VPN provider networks, the application-level relationships of a plurality of unidirectional tunnels cannot be easily determined, e.g., using conventional 5-tuple flow-classification or MPLS-label analysis. As a result, deep-packet inspection (DPI) services presently are not employed in MPLS/VPN networks, since they cannot effectively associate the unidirectional tunnels with corresponding application-level policies to apply to data traffic transported in the tunnels. The present invention solves this problem. Namely, unlike prior implementations, the invention provides a novel network device, such as the service control engine (SCE) 300, which can be configured to perform DPI services in the MPLS/VPN provider network 210. The SCE may be configured to perform DPI services that provide, inter alia, application-level policies for managing applications and/or subscribers in the provider network 210.

In accordance with the illustrative embodiment, the SCE 300 is configured to provide DPI services for a predetermined set of PE devices 230. For purposes of illustration and discussion, the exemplary SCE provides DPI services for the provider-edge deco vices PE1, PE2 and PE3, which are located in a "downstream" direction relative to the SCE 300. The SCE is also coupled to other provider-network devices, such as the provider device P1 290, located in an "upstream" direction. While the SCE 300 is illustratively inserted serially ("in-line") into the data path between P1 and the devices PE1, PE2 and PE3, alternative embodiments may position the SCE "off-line," e.g., such as parallel to the data path. For example, in an off-line configuration, a line splitter (not shown) or switch port analyzer (SPAN port) (not shown) may be used to generate a copy of the data packets forwarded over the data path between provider device P1 and the provider-edge devices PE1, PE2 and PE3. In such a case, the original data packets are forwarded over the data path between P1 and PE1, PE2 and PE3, and copies of the data packets are forwarded via the line splitter or SPAN port to the SCE 300 for DPI processing. Broadly stated, the SCE may be positioned in any in-line or off-line configuration consistent with the inventive technique described herein.

Preferably, the SCE 300 is transparently inserted into the provider network 210 and, as such, is not directly addressable by P or PE devices in the network. The SCE may include a management port for receiving information from a subscriber manager (SM) 240 in the provider network. The SM is a network device that is fully-meshed with the predetermined set of provider-edge devices PE1, PE2 and PE3 at the Border Gateway Protocol (BGP) level, i.e., by means of direct connections and/or conventional route reflectors (not shown). Thus, the SM 240 may receive BGP update messages directly from PE1, PE2 and PE3 or indirectly from the route reflector. The SM extracts certain information, such as VPN label values, from the advertised BGP update messages that it receives from the PE devices. The SM may forward the extracted information to the SCE 300 for use by the DPI services.

Operationally, when the SCE 300 receives a data packet corresponding to a new upstream data flow, the SCE attempts to "match" the received upstream data packet with a corresponding downstream data packet sent in the same VPN. The SCE determines that the upstream and downstream data packets match if they belong to opposing unidirectional tunnels established for use by the same application. To make this determination, the SCE may examine protocol-specific information stored in the upstream and downstream data packets. The protocol-specific information may correspond to any protocol in which an upstream data packet transports first information that can be correlated with second information transported in a downstream data packet sent in response to the upstream data packet. In the illustrative embodiment, TCP sequence numbers are used to match the upstream and downstream data packets. However, those skilled in the art will appreciate that alternative embodiments may use different protocols and/or different protocol-specific information for determining that the upstream and downstream data packets are associated with the same application.

Further to the illustrative embodiment, the SCE 300 is configured to identify a new upstream data flow when it receives a conventional TCP SYN data packet 250 from a PE device 230 in the SCE's associated predetermined set of PE devices, e.g., PE1, PE2 and PE3. As is well-known in the art and described in the above-incorporated RFC 793, an application may establish one or more bidirectional TCP data flows between source and destination nodes using a conventional 3-way TCP handshake. The TCP handshake begins when the source node sends the destination node a TCP SYN data packet 250 having a TCP sequence number 255, e.g., equal to X. In response, the destination node returns a TCP SYN/ACK data packet 270 having an "acknowledgment" TCP sequence number 275, e.g., equal to X+1. When the SCE 300 receives the downstream TCP SYN/ACK data packet, the SCE attempts to match the TCP SYN/ACK data packet 270 with the previously-received TCP SYN data packet 250 by comparing their respectively contained TCP sequence numbers. If the comparison indicates that the sequence numbers 255 and 275 match, i.e., equal X and X+1, then the SCE determines that the TCP SYN and SYN/ACK data packets 250 and 270 correspond to opposing unidirectional tunnels that are being established for use by the same application.

Further still to the illustrative embodiment, the SCE 300 associates the MPLS label stacks and destination MAC addresses of the matching TCP SYN and SYN/ACK data packets with a common layer-2 identification (L2ID) value. In the exemplary provider network 210, the upstream TCP SYN packet 250 includes an upstream MPLS label stack 260 including a "top" IGP label value 262, e.g., equal to 17, and "bottom" VPN label value 264, e.g., equal to 9. The downstream TCP SYN/ACK data packet 270 includes a downstream MPLS label stack 280 having only a VPN label value 282, e.g., equal to 13. Here, the downstream MPLS label stack 280 does not include an IGP label value because it is assumed that PE1, PE2 and PE3 are PHP-enabled devices. However, it is expressly contemplated that the present invention also may be deployed in alternative embodiments where at least some of the PE devices are not PHP-enabled.

For purposes of discussion, suppose that the SCE 300 receives the TCP SYN data packet 250 from the provider-edge device PE2 and that the destination MAC address stored in the TCP SYN data packet indicates that the packet's next-hop destination is a network interface in the provider device P1. Because the TCP SYN/ACK data packet 270 is sent in response to the TCP SYN data packet 250, the destination MAC address stored in the TCP SYN/ACK data packet corresponds to a network interface in the provider-edge device PE2. In this scenario, the SCE may associate the same L2ID value with both (i) the upstream MPLS label stack 260 and the destination MAC address (P1-MAC) stored in the TCP SYN data packet 250 and (ii) the downstream VPN label value 282 and the destination MAC address (PE2-MAC) stored in the TCP SYN/ACK data packet 270.

The SCE 300 classifies each data packet that it receives by first mapping the packet's contained MPLS label stack and destination MAC address to an equivalent L2ID value, then combining the L2ID value with the packet's conventional 5-tuple to create a novel 6-tuple which may be used to classify the packet. Unlike prior 5-tuple flow-classification procedures, the novel 6-tuple flow-classification technique enables the SCE to uniquely classify data packets on an application-level. That is, data packets trans-ported in unidirectional tunnels established for use by the same application are associated with the same set of 6-tuple values. Because a data packet can be associated with a particular application based on its identified 6-tuple, the DPI services in the SCE can select an appropriate set of application-level policies to apply to the data packet based on the packet's 6-tuple classification.

Figure 3:
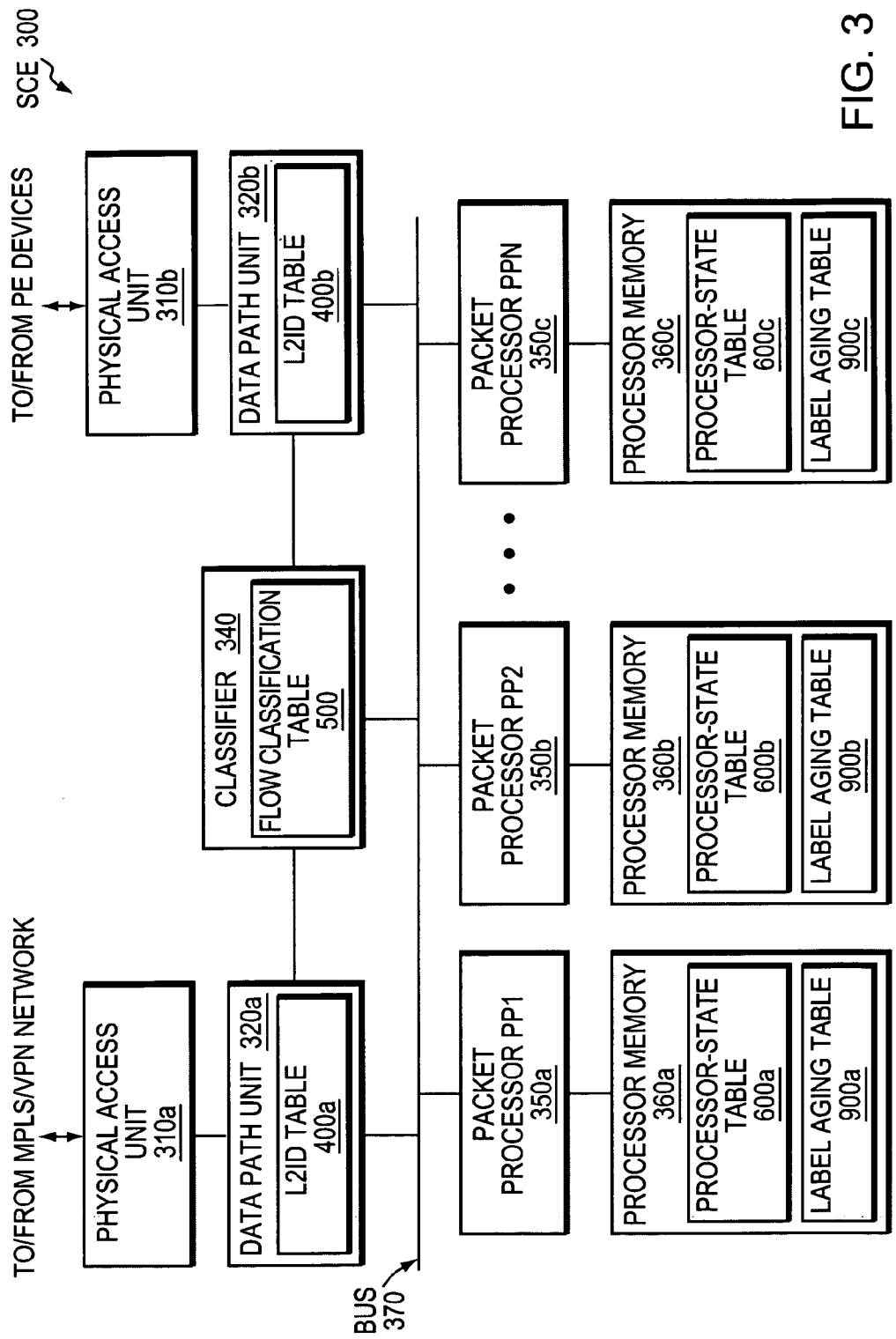
FIG. 3 is a schematic block diagram of an exemplary service control engine (SCE) that may be used to provide deep-packet inspection (DPI) services in accordance with the illustrative embodiment.

FIG. 3 illustrates a schematic block diagram of the exemplary SCE 300 which may be used to provide DPI services in the MPLS/VPN provider network 210 in accordance with the illustrative embodiment. The SCE includes, inter alia, physical access units 310a and 310b, data path units 320a and 320b, a classifier 340 and one or more packet processors 350 interconnected by a system bus 370.

The physical access units 310 comprise standard mechanical, electrical and signaling circuitry and logic for sending and receiving data packets in the provider network 210. For instance, the physical access unit 310b may be coupled to the predetermined set of PE devices, e.g., PE1, PE2 and PE3, and the physical access unit 310a may be coupled to P devices, such as P1, in the provider network. The SCE 300 also may include other physical access units (not shown), such as a physical access unit coupled to the SM 240. Each physical access unit 310 may be adapted to transfer and acquire data packets over various types of physical media including, but not limited to, Fast Ethernet (FE), Gigabit Ethernet (GE), wireless links, optical links, and so forth.

The data path units 320a and 320b input and store data packets captured by the physical access unit 310a and 310b, respectively. The data path units 320 can be created from hardware, software, or combinations thereof. In accordance with the illustrative embodiment, each data path unit 320 is configured to associate received data packets with their corresponding L2ID values. To that end, each data path unit 320 maintains a local L2ID table 400 that may be used to match a data packet's destination MAC address and MPLS label stack with a corresponding L2ID value. For example, the data path unit 320a includes a L2ID table 400a, and the data path unit 320b includes a L2ID table 400b.

In operation, every time a data path unit 320a,b receives a valid data packet, the data path unit extracts the packet's destination PE address and MPLS label stack and uses these extracted values to index an entry in the data path unit's L2ID table 400a,b. The indexed table entry identifies the data packet's corresponding L2ID value. The data packet's identified L2ID value then may be forwarded together with the packet's conventional 5-tuple 170 to the classifier 340 for further processing. In the event that an indexed L2ID-table entry cannot be found for the received data packet, the data path unit may send the packet's conventional 5-tuple along with a "non-matched" L2ID value to the classifier 340. The non-matched L2ID value may be a predetermined L2ID value indicating that a matching L2ID value could not be found for the data packet. Alternatively, the non-matched L2ID value may be indicated by sending only the packet's 5-tuple to the classifier, i.e., without an accompanying L2ID value.

The classifier 340 is configured to receive a data packet's 5-tuple and L2ID value from the data path units 320a and 320b and perform a stateful 6-tuple flow-classification procedure. The classifier combines the packet's L2ID value with the packet's conventional 5-tuple, thereby generating a novel 6-tuple value. The resulting 6-tuple is used as an index into a flow-classification table 500 stored in the classifier 340. The classifier is preferably implemented in hardware, firmware, software and/or combinations thereof, so that it can quickly perform lookups in its flow-classification table and classify received data packets, e.g., at around line speeds.

The flow-classification table 500 is configured to map one or more sets of 6-tuple values with their corresponding flow identifiers ("flow ID") values. Illustratively, each flow-ID value identifies a data flow whose data packets are classified using the flow ID's associated 6-tuple. For example, suppose that the flow-classification table 500 correlates a particular 6-tuple with a flow-ID value equal to 1. Accordingly, any data packet that is classified using this 6-tuple value will be associated with the flow-ID value equal to 1. Each flow-ID value also may be associated with an indication of which packet processor 350 has been selected, e.g., by the classifier 340, to perform DPI services for the data flow. Thus, after the classifier determines a flow-ID value for a received data packet, the classifier may forward the packet's flow-ID value to the packet processor 350 selected to perform DPI processing for the packet's data flow.

The SCE 300 includes one or more packet processors 350 that may be configured to perform DPI services for data flows identified by the classifier 340. Each of the packet processors PP1, PP2, . . . PPN is designated to perform DPI services for data packets belonging to a predetermined set of data flows. For example, a first packet processor (e.g., the processor PP1) may be designated to process data packets in data flows associated with a first flow-ID value, and a second packet processor (e.g., the processor PP2) may be designated to process data packets in data flows associated with a second flow-ID value. In this arrangement, as the number of data flows processed by the SCE 300 increases (or decreases), packet processors can be added (or removed) to accommodate the changing number of data flows.

Preferably, each packet processor 350 is coupled to a local processor memory 360. For example, as shown, the processors PP1 350a, PP2 350b, . . . PPN 350c are respectively coupled to the processor memories 360a, 360b and 360c. The processor memories 360 may be embodied as conventional random-access memories (RAM), and may be implemented as stand-alone memory elements or, alternatively, as logical subsections of one or more larger memory elements. In accordance with the illustrative embodiment, each processor memory 360 stores, among other things, a processor-state table 600 and a label-aging table 900. For example, the processor memories 360a-c respectively store processor-state tables 600a-c and label-aging tables 900a-c.

When a packet processor 350 receives a flow-ID value from the classifier 340, the packet processor uses the received flow-ID value to locate a matching entry in its processor-state table 600. Each processor-state table is configured to store state information associated with one or more data flows. The state information may include application-level and/or subscriber-related information that enables the packet processor 350 to select an appropriate set of application-level policies. For instance, after receiving the flow-ID value for a received data packet, the packet processor can (1) use the packet's flow-ID value to identify a matching entry in its processor-state table, (2) perform DPI services that inspect the contents of specific packet-header fields and/or payload data stored in the received data packet, and (3) select an appropriate set of application-level policies to apply to the received data packet based on results of the DPI processing and the state information stored in the packet's matching processor-state table entry.

After the packet processor 350 has finished processing the received data packet, the processed packet may be forwarded over the system bus 370 to a destination data path unit 320. The data packet then may be forwarded to an appropriate physical access unit 310 that transmits the packet to its next logical hop in its data flow. Notably, in some implementations where the SCE 300 receives only a copy of the data packet, e.g., from a line splitter, SPAN port, or the like, the processed data packet may be discarded after it is processed by the packet processor 350.

Each packet processor 350 may be configured to determine when a data flow has been closed due to a normal "close" flow sequence, such as receiving a conventional TCP FIN/ACK data packet, or has become "aged," i.e., and has not transported data packets to the SCE 300 within a predetermined period of time. Because the SM 240 receives BGP update messages from the predetermined set of PE devices PE1, PE2 and PE3, the SM can communicate which downstream VPN label values have been withdrawn and are no longer valid. However, the SM does not inform the SCE regarding which upstream MPLS label values are no longer valid. Thus, each packet processor 350a-c preferably maintains a local label-aging table 900a-c that associates upstream MPLS label stacks with timestamps corresponding to when the upstream MPLS label stacks were last used.

If an upstream MPLS label stack has not been used to transport data packets via the SCE 300 for the predetermined period of time, the packet processor 350 may determine that the upstream MPLS label stack is no longer being used in the MPLS/VPN provider network 210. In this situation, the packet processor 350 may remove, or instruct the data path unit 320b to remove, the upstream MPLS label stack (and its associated L2ID value) from the L2ID table 400b. Those skilled in the art will appreciate that the packet processors 350 may employ various aging algorithms, and therefore may rely on various metrics in addition to, or in place of, the illustrative timestamps in order to determine when an upstream MPLS label stack has become aged.

FIG. 4A illustrates an exemplary L2ID table 400a which may be stored in the data path unit 320a. The L2ID table 400a includes a plurality of table entries 410, each of which is configured to store a PE-MAC address 420, a downstream VPN label 430 and a L2ID value 440. Because the SM 240 receives BGP update messages from each PE device in the predetermined set of PE devices PE1, PE2 and PE3, the SM can "learn" the downstream VPN labels and loopback IP addresses advertised by these PE devices (or advertised from a route reflector coupled to the PE devices). The SM 240 may forward the advertised VPN label values and loopback IP addresses to the SCE 300. The SCE resolves the loopback IP addresses with corresponding PE-MAC addresses, and then allocates a unique L2ID value 440 for each pair of PE-MAC address 420 and downstream VPN label value 430. The SCE stores each set of values 420-440 in a separate entry 410 in the L2ID table 400*a*. For example, the L2ID table 400*a* may contain the illustrative table entries 410*a*, 410*b* and 410*c* corresponding to exemplary PE-MAC addresses and downstream VPN label values for the provider-edge devices PE1, PE2 and PE3.

When a data packet traveling in a downstream direction, e.g., from the provider device P1 to the SCE, is received at the physical access unit 310*a*, the received data packet may be forwarded to the data path unit 320*a*. The data path unit 320*a* may extract the downstream data packet's destination PE-MAC address 420 and VPN label value 430, which are then used to lookup the packet's L2ID value 440 in the L2ID table 400*a*. The downstream data packet's identified L2ID value 440 and its conventional 5-tuple value 170 may be forwarded from the data path unit 320*a* to the classifier 340 for further processing.

FIG. 4B illustrates an exemplary L2ID table 400*b* which may be stored in the data path unit 320*b*. The L2ID table 400*b* includes a plurality of table entries 450 that are each configured to store a P-MAC address 460, an upstream MPLS label stack 470 and a L2ID value 480. Unlike the L2ID table 400*a*, entries in the L2ID table 400*b* cannot be determined based on information provided by the SM 240. Rather, each table entry 450 contains a P-MAC address 460 and upstream MPLS label stack 470 that is dynamically associated with a L2ID value 480 based on a novel self-learning algorithm.

The novel self-learning algorithm is configured to dynamically associate an upstream data packet's destination P-MAC address 460 and upstream MPLS label stack 470 with a corresponding L2ID value 480 that was previously assigned to a downstream data packet "matching" the upstream data packet. To that end, the algorithm matches the upstream and downstream data packets based on protocol-specific information, such as TCP sequence numbers, stored in the upstream and downstream packets. After matching the upstream and downstream packets, the L2ID value 480 for the upstream data packet is set equal to the known L2ID value 440 of the downstream data packet, i.e., as determined from the L2ID table 400*a*. This inventive self-learning technique is described in more detail below with reference to FIGS. 7A-B.

After the L2ID value 480 for the upstream data packet has been dynamically learned using the novel self-learning algorithm, the L2ID value may be used to implement the inventive 6-tuple flow-classification procedure, which is described in more detail below with reference to FIG. 8. Specifically, when a data packet traveling in an upstream direction, e.g., from one of the provider-edge devices PE1, PE2 or PE3 to the SCE, is received at the physical access unit 310*b*, the received data packet may be forwarded to the data path unit 320*b*. The data path unit 320*b* may extract the upstream data packet's destination P-MAC address 460 and upstream MPLS label stack 470 (e.g., IGP and VPN label values) which are then used to lookup the packet's L2ID value 480 in the L2ID table 400*b*. The upstream data packet's identified L2ID value 480 and its conventional 5-tuple value 170 may be forwarded from the data path unit 320*b* to the classifier 340 for further processing.

FIGS. 5A-B illustrate an exemplary flow-classification table 500 that the classifier 340 may use to perform 6-tuple flow-classification in accordance with the illustrative embodiment. The table 500 includes a plurality of entries 510, each entry being configured to store a 5-tuple 520, a L2ID value 530 and a flow ID 540. Collectively, the 5-tuple 520 and L2ID value 530 constitute a novel 6-tuple that is associated with the flow ID 540.

Ordinarily, when a data packet is received at a physical access unit 310, the packet is forwarded to an appropriate data path unit 320. The data path unit looks up the packet's associated L2ID value in its L2ID table 400 and forwards the packet's L2ID value and the packet's conventional 5-tuple value 170 to the classifier 340. The classifier combines the packet's L2ID value with the packet's 5-tuple value to generate a 6-tuple for the received data packet. The packet's 6-tuple is then compared with the 6-tuples (fields 520 and 530) stored in the flow-classification table 500 until a matching table entry 510 can be located for the data packet. The flow ID 540 stored in the matching table entry identifies (i) a packet processor 350 that may be used to perform DPI services for the received data packet and (ii) a flow-ID value that identifies a particular entry in the packet processor's processor-state table 600.

Suppose that the received data packet is an upstream data packet corresponding to a new data flow in the provider network 210. In this case, the data packet is sent from a PE device and is received by the SCE 300 at the physical access unit 310*b*. The upstream data packet is forwarded from the physical access unit 310*b* to the data path unit 320*b*. Next, the data path unit 320*b* attempts to locate the packet's associated L2ID value by performing a lookup operation in its L2ID table 400*b*. However, because the upstream data packet corresponds to a new data flow, its L2ID value is not yet assigned and therefore cannot be located in the L2ID table 400*b*.

According to the illustrative embodiment, when the data path unit 320*b* cannot locate a L2ID value 480 in its L2ID table 400*b* for the received upstream data packet, the data path unit 320*b* sends the packet's conventional 5-tuple value 170 along with a non-matched L2ID value to the classifier 340. The classifier generates a 6-tuple by combining the packet's 5-tuple and the non-matched L2ID value and then attempts to locate a flow-classification table entry 510 containing the generated 6-tuple. However, because the received upstream data packet corresponds to a new data flow, the classifier will not be able to locate a matching table entry 510. Accordingly, in response to not being able to locate a matching table entry in the flow-classification table 500, the classifier 340 determines that the received data packet corresponds to a new data flow. Then, the classifier allocates a new flow-ID value 540 and selects a packet processor 350 to perform DPI services for the new data flow. Preferably, the flow-ID value 540 identifies a "free" (unused) entry in the selected packet processor's processor-state table 600. For ease of illustration and description, the illustrative flow-ID values 540 are shown formatted as the concatenation of a selected packet-processor's ID value and an allocated flow-ID value. However, those skilled in the art will understand that the packet-processor ID and flow-ID values alternatively may be stored in separate columns in the table 500 or in other functionally equivalent formats.

Figure 7A:
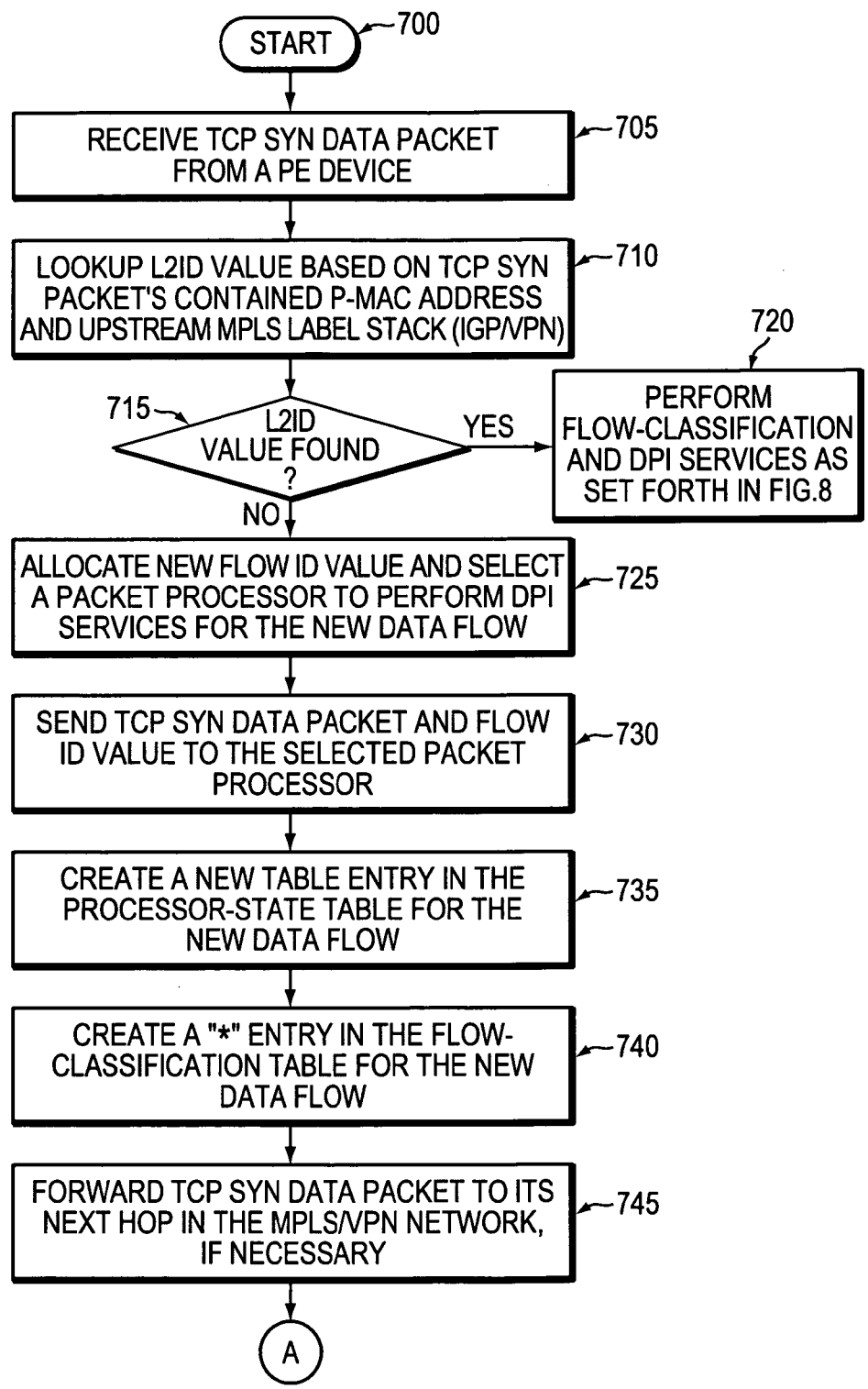
FIGS. 7A-B are a flowchart illustrating a sequence of steps that may be performed by the exemplary SCE for implementing the novel self-learning algorithm in accordance with the illustrative embodiment.
Figure 7B:
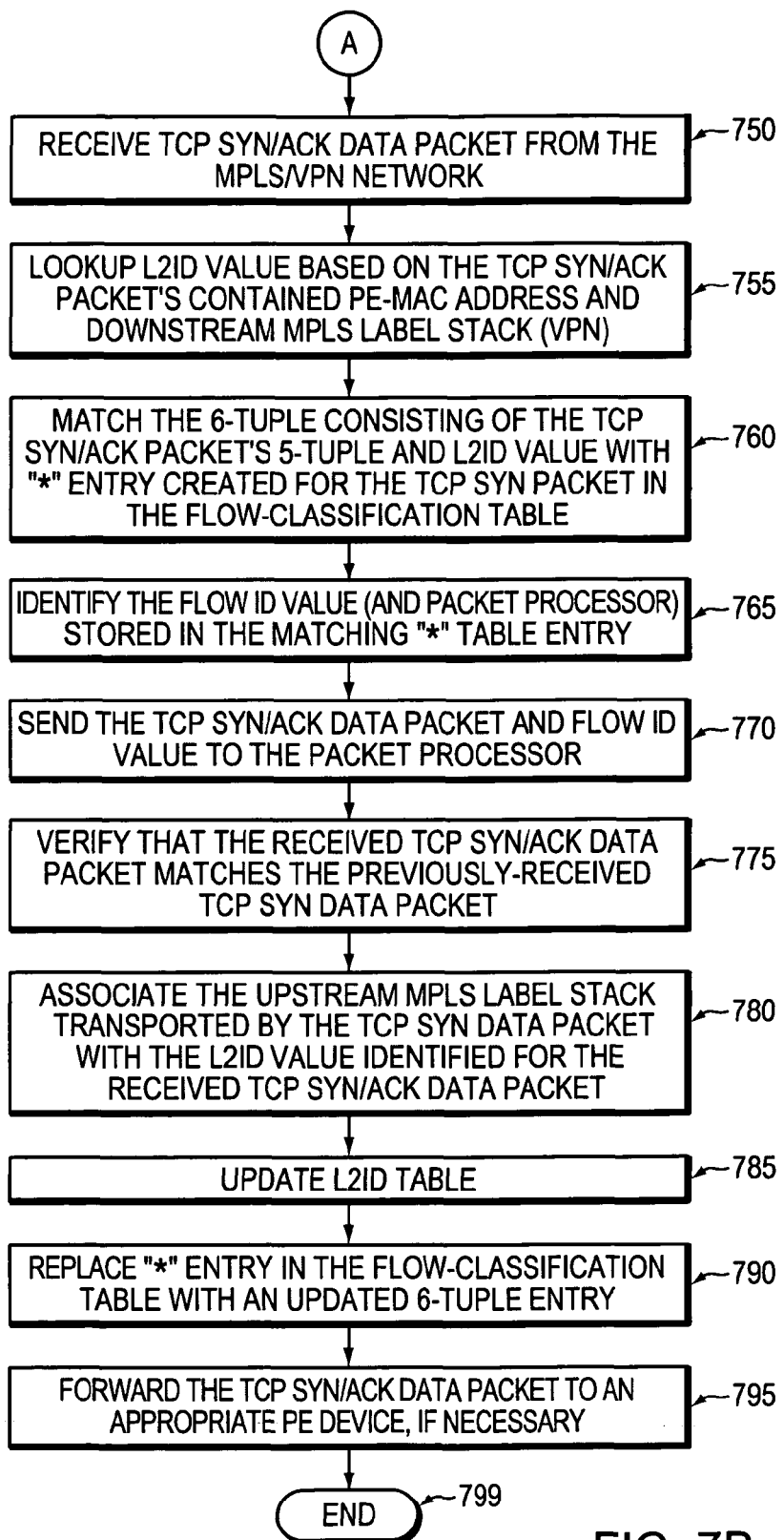

Next, the received data packet and its flow-ID value 540 are sent to the selected packet processor 350, which creates a new "*" entry in the classifier's flow-classification table 500. For example, as shown in FIG. 5A, the selected packet processor may store the upstream data packet's 5-tuple 520 along with a wildcard L2ID value 530 (i.e., a "*" value) in the flow-classification table entry 510*a*. Because the L2ID value is unknown for the received upstream data packet, the wildcard ("*") L2ID value 530 functions as a temporary L2ID placeholder until the actual L2ID value 530 for the upstream data packet can be learned using the novel self-learning algorithm (FIGS. 7A-B). Accordingly, the "*" table entry 510*a* ensures that the classifier 340 will associate the upstream data packet's flow-ID value 540, e.g., PP1-6, with any downstream data packet containing the same 5-tuple 520 as the received upstream data packet, regardless of the downstream data packet's L2ID value, e.g., identified in the L2ID table 400*a*.

For example, consider a downstream data packet that is subsequently received by the SCE at the physical access unit 310*a*. Assume that the downstream data packet corresponds to the same application as the previously-received upstream data packet. As such, the downstream data packet contains the same 5-tuple 520 as the upstream data packet, and thus matches the "*" table entry 510*a* in the flow-classification table 500. In this case, the downstream data packet is classified as having the same flow-ID value 540, e.g., PP1-6, as the previously-received upstream data packet.

Although the downstream data packet matches the "*" table entry 510*a*, the downstream data packet is sent to the appropriate packet processor, e.g., PP1, which verifies that the downstream data packet indeed matches the upstream data packet. To that end, the packet processor may compare protocol-specific information, such as TCP sequence numbers, stored in the upstream and downstream data packets. If the packet processor determines that the received downstream data packet matches the upstream data packet, then the processor equates the L2ID value 480 for the previously-received upstream data packet with the downstream data packet's L2ID value 440 identified in the L2ID table 400*a*. Then, the packet processor replaces the "*" table entry 510*a* with a new table entry 510*b*, as shown in FIG. 5B. Specifically, the new table entry 510*b* stores the same 5-tuple 520 and flow-ID value 540 as was stored in the "*" table entry 510*a*, although the wildcard "*" L2ID value 530 is replaced with the downstream data packet's L2ID value 440. Thereafter, the classifier 340 may use the table entry 510*b* to perform 6-tuple flow-classification for data packets subsequently received at the SCE 300.

FIG. 6 illustrates an exemplary processor-state table 600 that may be used to store state information for a packet processor 350 in accordance with the illustrative embodiment. The table 600 includes one or more table entries 610 configured to store, among other things, a flow-ID value 620, a TCP sequence number 630, a provider-device MAC (P-MAC) address 640, an upstream MPLS label stack 650, as well as various state information 660 associated with data flows in the MPLS/VPN provider network 210. Preferably, at least some of the state information stored in the field(s) 660 is used by the packet processor 350 to effectuate DPI services and/or application-level policies in the provider network.

The flow-ID value 620 identifies a particular data flow for which DPI services may be employed in the provider network 210. When the classifier 340 classifies a received data packet and identifies the packet's flow-ID value 540, the classifier forwards the flow-ID value 540 to the appropriate packet processor 350 associated with the flow-ID value. Then, the packet processor uses the received flow-ID value 540 to locate a matching processor-state table entry 610 containing the same flow-ID value 620. The packet processor performs its DPI services and application-level polices for the received data packet based on state information 660 stored in the matching processor-state table entry 610. The TCP sequence number 630 stores a TCP sequence number 255 identified in a received TCP SYN data packet 250. The P-MAC address 640 stores a destination MAC address transported by the TCP SYN data packet 250. The upstream MPLS label stack 630 stores a MPLS label stack transported by the TCP SYN data packet 250.

Each table entry 610 may be configured to store one or more types of state information 660 that may be used by the DPI services executed by the packet processor. For example, such state information may include at least one of: an application identifier, a subscriber identifier, a pass/block status, data-flow statistics (such as the number of bytes received), quality-of-service information (such as subscriber or application priority levels), bandwidth-shaping information (such as minimum or maximum-bandwidth constraints), subscriber-billing information as well as other types of state information. The foregoing list is merely representative of some of the types of state information 660 that may be stored in the table entry 610 and is not meant to be limiting in any manner. Of course, there exists many other types of state information 660 that may be stored in the processor-state table entry 610 for use by the DPI services.

FIG. 9 illustrates an exemplary label-aging table 900 that may be used in accordance with the illustrative embodiment. The table 900 is configured to store one or more table entries 905 containing, inter alia, a provider-device MAC (P-MAC) address 910, an upstream MPLS label stack 920 and a timestamp 930. More specifically, each table entry 905 stores a P-MAC address 910 and an upstream MPLS label stack 920 learned by the SCE in response to receiving an upstream TCP SYN data packet 250. The entry 905 also stores a timestamp 930 indicating when the last upstream data packet was received containing both the P-MAC address 910 and MPLS label stack 920. Preferably, at least one of the packet processors 350 executes an aging process (or thread) that manages the contents of the label-aging table 900 and determines when an upstream MPLS label stack 920 has not been used to transport data packets via the SCE 300 for the predetermined period of time. In this situation, the packet processor may remove, or instruct the data path unit 320*b* to remove, the upstream MPLS label stack (and its associated L2ID value) from the L2ID table 400*b*. Those skilled in the art will appreciate that the packet processors 350 may employ various aging algorithms, and therefore may rely on various metrics in addition to, or in place of, the illustrative timestamps 930 in order to determine when an upstream MPLS label stack 920 has become aged.

DPI Services Using 6-Tuple Flow Classification

In accordance with the illustrative embodiment, the SCE 300 is configured to perform a novel self-learning algorithm that analyzes data packets belonging to different unidirectional tunnels in the MPLS/VPN provider network 210 and determines whether the analyzed data packets transport data in the same VPN. If so, the unidirectional tunnels containing the analyzed data packets are associated with a common layer-2 identification (L2ID) value. Unlike conventional flow-classification procedures, the inventive technique classifies data packets by first associating the data packets with corresponding L2ID values and then classifying the data packets as belonging to particular data flows based on their associated L2ID values in combination with other flow-classification information. For instance, in the illustrative embodiment, a stateful flow-classification procedure classifies data packets using a novel 6-tuple consisting of a conventional 5-tuple plus the L2ID value. Because unidirectional tunnels corresponding to the same application data flow transport data packets having the same set of 6-tuple values, DPI services can apply application-level policies to the classified data packets consistent with their 6-tuple flow classifications.

FIGS. 7A-B illustrates a sequence of steps that the SCE 300 may perform for dynamically learning ("self learning") L2ID values of upstream unidirectional tunnels in accordance with the illustrative embodiment. The sequence starts at step 700 and proceeds to step 705 where the physical access unit 310b in the SCE receives an upstream TCP SYN data packet 250 sent from a PE device 230. The physical access unit 310b forwards the TCP SYN data packet to the data path unit 320b. At step 710, the data path unit 320b extracts the packet's destination P-MAC address and upstream MPLS label stack 260 (IGP and VPN labels 262 and 264) and attempts to lookup the packet's associated L2ID value 480 in the L2ID table 400b. At step 715, the data path unit 320b determines whether a L2ID value 480 for the received TCP SYN data packet can be found in the table 400b. If so, the sequence advances to step 720 where 6-tuple flow-classification and DPI services are performed as set forth in FIG. 8.

Because the received TCP SYN data packet 250 corresponds to a new upstream unidirectional tunnel, e.g., being established for use by a new data flow, assume that a L2ID value 480 cannot be located in the L2ID table 400b for the received TCP SYN data packet. In this situation, the data path unit 320b forwards a conventional 5-tuple value 170 for the packet to the classifier 340 and a non-matched L2ID value indicating that a L2ID value could not be found for the received data packet. The classifier receives the packet's 5-tuple value and non-matched L2ID value and attempts to locate a matching table entry 510 for the packet in the flow-classification table 500. Since the received TCP SYN data packet corresponds to a new data flow, the classifier does not locate a matching table entry 510. Thereafter, the classifier 340 allocates a flow-ID value 540 for the new data flow and selects a packet processor 350 to perform DPI services for the data flow, at step 725. The classifier may select the flow-ID value 540 from a "pool" of available values, or may employ any other technique for selecting both the flow-ID value and packet processor. Next, at step 730, the classifier 340 sends the received TCP SYN data packet 250 and its allocated flow-ID value 540 to the selected packet processor 350.

At step 735, the packet processor 350 receives the flow-ID value 540 from the classifier 340 and creates a new table entry 610 in its processor-state table 600 for the new data flow. Alternatively, the packet processor may use the received flow-ID value 540 to locate an existing, unused table entry 610 matching the flow-ID value. In either case, the packet processor updates the contents of the data flow's processor-state table entry 610 based on the contents of the received TCP SYN data packet. For example, the packet processor may store, among other things, the TCP SYN data packet's TCP sequence number 255, destination P-MAC address and upstream MPLS label stack 260 in appropriate fields 630-650 of the table entry 610.

Next, at step 740, the packet processor 350 creates a new "*" table entry 510a in the flow-classification table 500 for the new data flow. The "*" table entry stores the conventional 5-tuple 520 extracted from the TCP SYN data packet 250. The table entry 510a also stores a wildcard ("*") L2ID value 530 as well as the flow-ID value 540 allocated for the data flow. At step 745, the TCP SYN data packet 250 is forwarded to the data path unit 320a, then to the physical access unit 310a, where the packet is transmitted to its next-hop destination in the MPLS/VPN provider network 210. Notably, if the SCE 300 is configured to receive a copy of the TCP SYN data packet 250, e.g., from a line splitter, SPAN port, or the like, then step 745 may not be necessary.

At step 750, a downstream TCP SYN/ACK data packet 270 sent from a provider device, such as P1, is received at the physical access unit 310a. Here, the TCP SYN/ACK data packet 270 corresponds to a downstream unidirectional tunnel used to transport data traffic for the same application that established the upstream unidirectional tunnel containing the previously-received TCP SYN data packet 250. The physical access unit 310a forwards the received TCP SYN/ACK data packet to the data path unit 320a. At step 755, the data path unit 320a extracts the TCP SYN/ACK data packet's destination PE-MAC address and downstream MPLS label stack 280 (VPN label 282) and uses these extracted values to look up the packet's associated L2ID value 440 stored in the L2ID table 400a. The L2ID value 440 and the packet's conventional 5-tuple value 170 may be forwarded to the classifier 340 for processing.

In response to receiving the TCP SYN/ACK data packet's L2ID value 440 and 5-tuple value, the classifier 340 generates a 6-tuple by combining the received L2ID and 5-tuple values. At step 760, the classifier uses the generated 6-tuple to index a matching table entry 510 in its flow-classification table 500. In particular, because the 5-tuple extracted from the TCP SYN/ACK data packet 270 is the same as the 5-tuple that was extracted from the previously-received TCP SYN data packet 250, the TCP SYN/ACK data packet's 6-tuple matches the "*" table entry 510a in the flow-classification table. That is, the "*" table entry 510a stores the 5-tuple 520 stored in the TCP SYN and SYN/ACK data packets and also stores a wildcard L2ID value 530 that, by definition, matches the TCP SYN/ACK data packet's L2ID value 440.

At step 765, the classifier 340 identifies the flow-ID value 540 and packet processor 350 identified in the "*" table entry 510a. Then, at step 770, the received TCP SYN/ACK data packet 270 and its associated flow-ID value are forwarded to the identified packet processor. After receiving the flow-ID value 540 for the TCP SYN/ACK data packet, the packet processor verifies that the downstream TCP SYN/ACK data packet 270 matches the previously-received upstream TCP SYN data packet 250, at step 775. More specifically, the packet processor determines whether the TCP SYN and SYN/ACK data packets correspond to opposing unidirectional tunnels in the same VPN. To that end, the processor compares protocol-specific information, such as the TCP sequence numbers, stored in the upstream and downstream data packets 250 and 270. For example, if the packet processor determines that the downstream TCP SYN/ACK data packet 270 contains a TCP sequence number 275 equal to X+1 and the previously-received TCP SYN data packet 250 stored a TCP sequence number 255 equal to X, then the TCP SYN and SYN/ACK data packets may be determined to match.

After verifying that the TCP SYN and SYN/ACK data packets 250 and 270 match, at step 780 the packet processor associates the TCP SYN data packet's destination P-MAC address 640 and upstream MPLS label stack 650 with the L2ID value 440 identified for the TCP SYN/ACK data packet 270. At step 785, the packet processor updates the L2ID table 400b to indicate that the L2ID value 440 of the TCP SYN/ACK data packet 270 has been associated with the P-MAC address and upstream MPLS label stack of the TCP SYN data packet 250. Accordingly, the packet processor may add a new table entry 450 in the L2ID table 400b, such that the new table entry stores the TCP SYN data packet's P-MAC address 460 and upstream MPLS label stack 470 as well as a L2ID value 480 equal to the L2ID value 440 identified for the TCP SYN/ACK data packet 270. As a result, both of the TCP SYN and SYN/ACK data packets 250 and 270 are associated with a common L2ID value.

At step 790, the packet processor 350 removes the "*" table entry 510a from the flow-classification table 500 and replaces it with a new table entry 510b that associates the TCP SYN and SYN/ACK data packet's conventional 5-tuple with their common L2ID value. Next, at step 795, the TCP SYN/ACK data packet 270 is forwarded to the data path unit 320b, then to the physical access unit 320b, and the packet is transmitted to an appropriate PE device 230 in the provider network 210. Notably, if the SCE 300 is configured to receive a copy the TCP SYN/ACK data packet 270, e.g., from a line splitter, SPAN port, or the like, then step 795 may not be necessary. The sequence ends at step 799.

Figure 8:
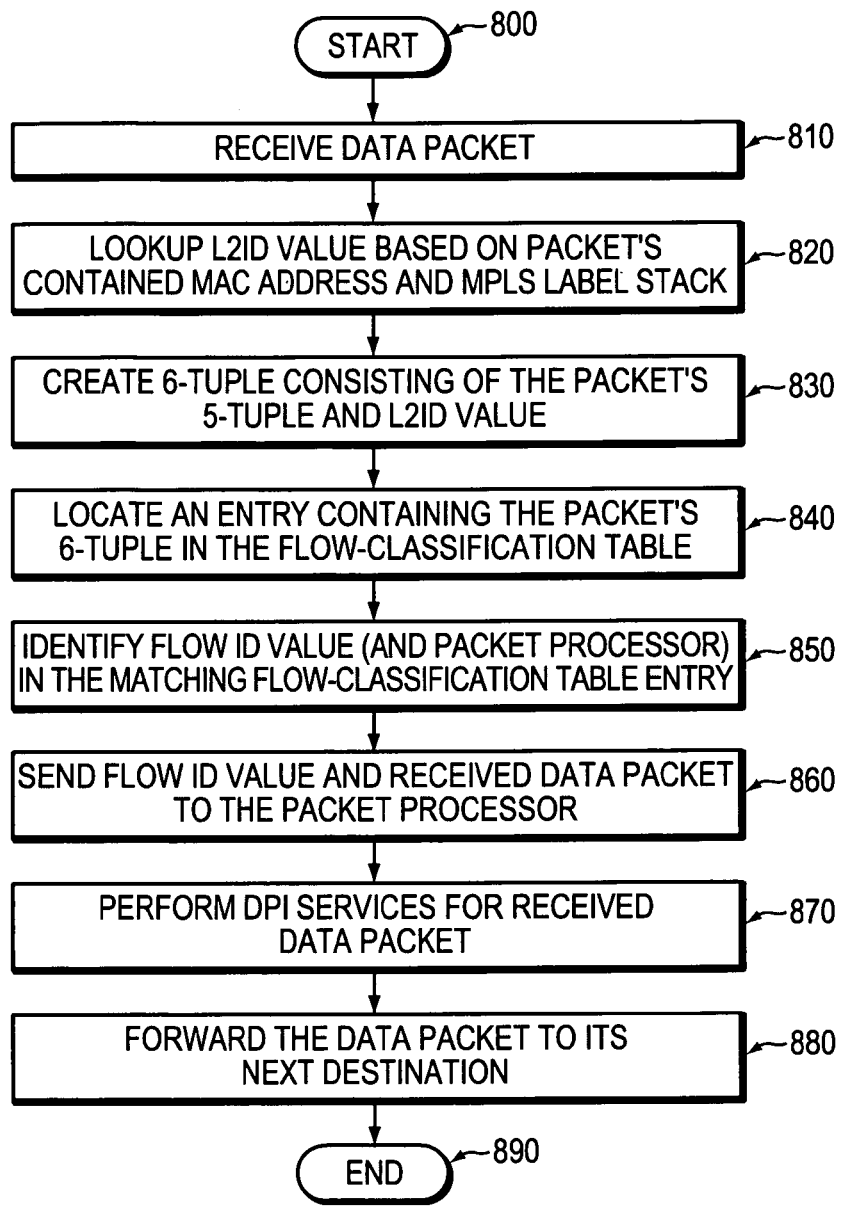
FIG. 8 is a flowchart illustrating a sequence of steps that may be performed by the exemplary SCE for performing stateful 6-tuple flow-classification and DPI services in accordance with the illustrative embodiment.

FIG. 8 illustrates a sequence of steps that the SCE 300 may employ for performing stateful 6-tuple flow-classification and DPI services in the exemplary MPLS/VPN provider network 210. The sequence starts at step 800 and proceeds to step 810 where a data packet is received at a physical access unit 310 in the SCE 300. At step 820, a data path unit 320 in the SCE looks up a L2ID value for the received packet using an appropriate L2ID table 400. Specifically, a destination MAC address and MPLS label stack may be extracted from the received data packet, and the extracted MAC address and MPLS label stack together may be used to identify a L2ID value in the L2ID table.

Next, at step 830, the classifier 340 in the SCE creates a 6-tuple consisting of the received data packet's conventional 5-tuple and its identified L2ID value. The classifier uses the 6-tuple to locate a flow-classification table entry 510 containing the same set of 6-tuple values. At step 850, the classifier identifies a flow-ID value 540 and a packet processor 350 based on the contents of the located table entry 510. At step 860, the flow-ID value 540 and received data packet are forwarded to the identified packet processor 350. Then, at step 870, the packet processor receives the flow-ID value 540 and uses the flow-ID value to locate a matching table entry 610 in its processor-state table 600. The packet processor performs DPI services for the received data packet based on state information 660 stored in the matching processor-state table entry 610. At step 880, the received data packet is forwarded to its next-hop destination in the MPLS/VPN provider network 210. The sequence ends at step 890.

Advantageously, the present invention may be implemented in hardware, software, firmware or various combinations thereof without departing from the spirit and scope of the invention. Further, the invention may be deployed in various network topologies in which conventional 5-tuple flow classification prevents DPI services from applying a consistent set of application-level policies to unidirectional tunnels established for use by the same application.

The foregoing has been a detailed description of illustrative embodiments of the invention. Various modifications and additions can be made without departing from the spirit and scope of the invention. For example, although the illustrative embodiment is configured to match an upstream TCP SYN data packet 250 with a corresponding downstream TCP SYN/ACK data packet 270 based on their respective TCP sequence numbers 255 and 275, those skilled in the art will appreciate that the inventive technique is more generally applicable for matching upstream and downstream data packets using various protocols and protocol-specific information. The protocol-specific information may correspond to any protocol in which an upstream data packet transports first information that can be correlated with second information transported in a downstream data packet sent in response to the upstream data packet. For example, in alternative embodiments, the protocol-specific information may correspond to, for example, L2TP session identifiers and/or tunnel identifiers, UDP sequence numbers, and so forth.

Further, while the PE devices described herein are PHP-enabled devices, those skilled in the art will appreciate that the inventive principles herein apply equally to non-PHP enabled implementations. Additionally, although the illustrative embodiment assumes a one-to-one correspondence between customer sites 220 and VPNs, those skilled in the art will understand that the technique also may be deployed in networks in which customer sites are permitted to participate in more than one VPN.

It is expressly contemplated that the teachings of this invention can be implemented as software, including a computer-readable medium having program instructions stored thereon, hardware, firmware, electromagnetic signals carrying instructions for execution by a processor, or any combination thereof. More generally, the inventive technique may be implemented in various combinations of hardware and/or software. Accordingly, this description is meant to be taken only by way of example and not to otherwise limit the scope of the invention.

What is claimed is:

1. A method comprising:
   receiving a data packet at a network device;
   identifying a layer-2 identification (L2ID) value for the received data packet based on a destination media access control (MAC) address and a label stack of the received data packet, the L2ID value specific to an application associated with the data packet, the L2ID value distinct from any MAC address and any virtual private network (VPN) label included in the label stack of the received data packet;
   creating a 6-tuple that includes the L2ID value, wherein the creating includes
       generating a 5-tuple that includes a protocol identifier, a source internet protocol (IP) address, a destination IP address, a source port number, and a destination port number, and
       combining the generated 5-tuple with the L2ID;
   classifying the received data packet using the 6-tuple;
   performing deep packet inspection (DPI) services based on the classification of the received data packet, the DPI services applying a set of one or more application-level policies to the received data packet; and
   forwarding the received data packet from the network device toward a destination.

2. The method of claim 1, wherein the classifying further comprises:
   using the 6-tuple to identify a flow identifier (ID) value; and
   the performing further comprises:
   performing the DPI services based on the identified flow ID value.

3. The method of claim 2, wherein the using further comprises:
   locating an entry containing the 6-tuple in a flow classification table; and
   identifying a flow value in the entry.

4. The method of claim 2, wherein the performing further comprises:
   sending the received data packet to a packet processor associated with a flow corresponding to the flow ID.

5. The method of claim 1, wherein the receiving receives the data packet from a unidirectional tunnel of a Multi-Protocol Label Switching/Virtual Private Network (MPLS/VPN) network.

6. The method of claim 1, wherein the label stack includes interior-gateway protocol (IGP) label values and VPN label values.

7. The method of claim 1, wherein the identifying further comprises:
   looking up the L2ID value in a L2ID table using the destination MAC address and the label stack of the received data packet.

8. The method of claim 1, wherein the identifying further comprises:
   determining a L2ID table does not include an entry for the destination MAC address and the label stack of the received data packet; and
   allocating the L2ID value.

9. The method of claim 1, wherein the network device includes a packet processor, a processor memory, and one or more physical access units, and the identifying, creating, classifying and performing are performed by the network device.

10. An apparatus comprising:
   a first physical access unit configured to receive a data packet;
   a data path unit configured to identify a layer-2 identification (L2ID) value for the received data packet based on a destination media access control (MAC) address and a label stack of the received data packet, the L2ID value specific to an application associated with the data packet, the L2ID value distinct from any MAC address and any virtual private network (VPN) label included in the label stack of the received data packet;
   a classifier configured to create a 6-tuple that comprises a 5-tuple, which includes a protocol identifier, a source internet protocol (IP) address, a destination IP address, a source port number, a destination port number, combined with the L2ID value, and classify the received data packet using the 6-tuple;
   a packet processor configured to apply a set of one or more application-level policies to the received data packet based on the classification of the received data packet; and
   a second physical access unit configured to forward the received data packet toward a destination.

11. The apparatus of claim 10, wherein the classifier is further configured to use the 6-tuple to identify a flow identifier (ID) value, and the packet processor is further configured to apply the set of one or more application-level policies based on the identified flow ID value.

12. The apparatus of claim 11, wherein the classifier is further configured to locate an entry containing the 6-tuple in a flow classification table, and identify a flow value in the entry.

13. The apparatus of claim 11, wherein the packet processor is associated with a flow corresponding to the flow ID.

14. The apparatus of claim 10, wherein first physical access unit is coupled to a unidirectional tunnel of a Multi-Protocol Label Switching/Virtual Private Network (MPLS/VPN) network.

15. The apparatus of claim 10, wherein the label stack includes interior-gateway protocol (IGP) label values and VPN label values.

16. The apparatus of claim 10, wherein the data path unit is further configured to look up the L2ID value in a L2ID table using the destination MAC address and the label stack of the received data packet.

17. The apparatus of claim 10, wherein the data path unit is further configured to determine a L2ID table does not include an entry for the destination MAC address and the label stack of the received data packet, and cause the L2ID value to be allocated.

18. Software encoded on one or more non-transitory computer readable media that when executed is operable to:
   identify a layer-2 identification (L2ID) value for a data packet based on a destination media access control (MAC) address and a label stack of the data packet, the L2ID value specific to an application associated with the data packet, the L2ID value distinct from any MAC address and any virtual private network (VPN) label included in the label stack of the data packet;
   create a 6-tuple that includes the L2ID value by generation of a 5-tuple that includes a protocol identifier, a source internet protocol (IP) address, a destination IP address, and a destination port number, and combination of the generated 5-tuple with the L2ID;
   classify the data packet using the 6-tuple; and
   perform deep packet inspection (DPI) services based on the classification of the data packet, the DPI services applying a set of one or more application-level policies to the data packet.

* * * * *